(12) United States Patent
Marlow et al.

(10) Patent No.: US 11,400,825 B2
(45) Date of Patent: Aug. 2, 2022

(54) AC/DC EVSE CHARGING SYSTEM

(71) Applicant: GM GLOBAL TECHNOLOGY OPERATIONS LLC, Detroit, MI (US)

(72) Inventors: Alexander T. Marlow, Center Line, MI (US); Jacob A. St George, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 124 days.

(21) Appl. No.: 16/953,780

(22) Filed: Nov. 20, 2020

(65) Prior Publication Data

US 2022/0161676 A1 May 26, 2022

(51) Int. Cl.
| | | |
|---|---|---|
| *B60L 53/00* | (2019.01) | |
| *B60L 53/60* | (2019.01) | |
| *B60L 53/16* | (2019.01) | |
| *B60L 53/30* | (2019.01) | |
| *B60L 53/53* | (2019.01) | |
| *B60L 53/62* | (2019.01) | |
| *B60L 53/66* | (2019.01) | |

(Continued)

(52) U.S. Cl.
CPC ............. *B60L 53/60* (2019.02); *B60L 53/16* (2019.02); *B60L 53/305* (2019.02); *B60L 53/53* (2019.02); *B60L 53/62* (2019.02); *B60L 53/64* (2019.02); *B60L 53/665* (2019.02); *B60L 55/00* (2019.02); *B60L 2210/10* (2013.01); *B60L 2210/30* (2013.01)

(58) Field of Classification Search
CPC ........ B60L 53/60; B60L 53/16; B60L 53/305; B60L 53/53; B60L 53/62; B60L 53/64; B60L 53/665; B60L 55/00; B60L 2210/10; B60L 2210/30
See application file for complete search history.

(56) References Cited

U.S. PATENT DOCUMENTS

| | | | | |
|---|---|---|---|---|
| 11,203,267 | B2 * | 12/2021 | Prasad | .................. H02J 7/0021 |
| 2016/0121735 | A1 * | 5/2016 | Sugano | .................. H02J 7/342 |
| | | | | 320/109 |

(Continued)

FOREIGN PATENT DOCUMENTS

| | | | |
|---|---|---|---|
| CN | 103762689 A | * | 4/2014 |
| CN | 114342009 A | * | 4/2022 |

(Continued)

*Primary Examiner* — Naum Levin
(74) *Attorney, Agent, or Firm* — Vivacqua Crane PLLC (57) ABSTRACT

An Electric Vehicle Supply Equipment (EVSE) charging system that can simultaneously deliver both Alternating Current (AC) and Direct Current (DC) power to Plug-in Electric Vehicle's (PEV) AC voltage bus and DC voltage bus, respectively. Either a Combined Charging System (CCS) coupler or separate paired AC and DC couplers provide the connection between the EVSE's vehicle connector(s) and the PEV's inlet(s). The EVSE is configured to simultaneously supply AC and DC power to the vehicle when connected to the PEV. The EVSE coupler(s) facilitate communication between a PEV and the EVSE charging system when connected to the charging inlet(s) of the PEV. Connection of the AC voltage bus to the PEV is controlled by one or more relays, while and connection of the DC voltage bus to the PEV is controlled by operation of an Offboard Charging Module (OBCM).

20 Claims, 2 Drawing Sheets

(51) Int. Cl.
   *B60L 55/00* (2019.01)
   *B60L 53/64* (2019.01)

(56) References Cited

U.S. PATENT DOCUMENTS

2020/0274375 A1* 8/2020 Griffiths ................ H02J 7/0029
2021/0370795 A1* 12/2021 Kydd ...................... B60L 55/00
2022/0131398 A1* 4/2022 Herranz .............. H02J 7/00304

FOREIGN PATENT DOCUMENTS

| DE | 102014208015 A1 * 10/2015 | .............. B60L 11/18 |
| DE | 102015211997 A1 * 12/2016 | |
| EP | 3790154 A1 * 3/2021 | ......... B60H 1/00642 |
| WO | WO-2014199203 A2 * 12/2014 | ......... B60L 11/1842 |
| WO | WO-2021092658 A1 * 5/2021 | |

* cited by examiner

AC/DC EVSE CHARGING SYSTEM

INTRODUCTION

The present disclosure generally relates to an Electric Vehicle Supply Equipment (EVSE) charging system and method for simultaneously providing Alternating Current (AC) and Direct Current (DC) power to an electric vehicle.

Hybrid electric vehicles use high-voltage batteries as an energy storage device to power one or more electric machines and thereby deliver torque to the vehicle's driveline, either alone or in conjunction with an internal combustion engine. The term "Plug-in Electric Vehicle (PEV)" describes any vehicle (e.g. battery electric, hybrid electric, etc.) that can be charged by connecting the vehicle to an EVSE charging system. The connection between a PEV and an EVSE charging system allows transfer of either AC or DC electrical energy to a PEV (e.g. when recharging the PEV's high-voltage batteries) and from the PEV to an external load. High-voltage batteries are DC power devices and require AC/DC power conversion equipment installed on the PEV for it to accept AC power. High power charging entails the use of heavy and complex systems to charge a PEV, so AC charging is often limited on PEVs to constrain cost, mass, and complexity. PEVs often are equipped with both AC and DC charging capabilities but unable to accept AC and DC power simultaneously, leading to charging equipment to be unutilized during a charging event. If on-vehicle AC charging equipment and off-vehicle DC charging equipment could function in parallel, total charging equipment needed to charge a PEV at high power is minimized. For this reason, it is desirable to develop an EVSE charging system can deliver both AC and DC power to a PEV, as this optimization provides benefits to total energy transfer system cost and vehicle mass, volume, and complexity.

SUMMARY

The present disclosure describes an Electric Vehicle Service Equipment (EVSE) charging system. In an aspect of the present disclosure, the EVSE charging system includes an EVSE AC voltage bus connectable to an AC power supply and at least one coupler configured to be connected to a charge port of a vehicle (e.g., Plug-In Electric Vehicle (PEV)). The coupler is configured to simultaneously supply an alternating current (AC) power and a direct current (DC) power to the vehicle. The coupler establishes communication between the vehicle and the EVSE charging system when the coupler is connected to the charge port of the vehicle. The EVSE AC voltage bus is selectively connected to the coupler. The EVSE charging system includes an offboard charging module (OBCM) electrically connected to the EVSE AC voltage bus. The OBCM is configured to convert the AC power to the DC power. The OBCM is electrically connected between the coupler and the AC power supply. The EVSE charging system includes an EVSE DC voltage bus electrically connected to the coupler and at least one relay connected between the AC power supply and the coupler. The relay has a closed state and an open state. The EVSE charging system is configured to simultaneously provide the AC power and the DC power to the vehicle through the coupler when the at least one relay is in the closed state. The EVSE charging system is configured to solely provide DC power to the vehicle through the coupler when the at least one relay is in the open state. The EVSE charging system includes an EVSE controller coupled to the relay.

The EVSE controller is programmed to: determine whether both the vehicle and the EVSE charging system are compatible with simultaneous AC and DC charging; and in response to determining that both the vehicle and the EVSE charging system are compatible with simultaneous AC and DC charging, command the at least one relay to switch to the closed state to simultaneously provide the AC power and the DC power to the vehicle through the coupler.

The EVSE DC voltage bus may be electrically connected to the coupler regardless of whether the at least one relay is in the open state or the closed state. The OBCM and the relay may be electrically connected in parallel to simultaneously provide the AC power and the DC power to the vehicle through the coupler when the at least one relay is in the closed state.

The EVSE charging system may further includes an energy management module electrically connected to the EVSE AC voltage bus and the EVSE DC voltage bus. The energy management module functions as a vehicle to home (V2H) system or a vehicle to grid (V2G) system to enable the vehicle to act as a power source. The energy management module includes an inverter electrically connected to the EVSE AC voltage bus, and the inverter is configured to convert DC voltage into AC voltage.

The EVSE charging system may further include a battery pack module electrically connected to the EVSE DC voltage bus. The battery pack module includes a DC-DC converter electrically connected to the EVSE DC voltage bus. The battery pack module further includes a plurality of battery cells electrically connected to the DC-DC converter, the DC-DC converter is electrically coupled between the coupler and the plurality of battery cells. The DC-DC converter is configured to change a voltage output received through the coupler from a first voltage output to a second voltage output that is compatible with the plurality of battery cells.

The EVSE charging system may further include a utility meter, a transfer switch, and a load center electrically connected to the AC power supply. The transfer switch is electrically connected between the utility meter and the load center, the load center includes AC overcurrent protection devices. At least one of the AC overcurrent protection devices may be a breaker.

The OBCM may be a first OBCM. The EVSE charging system may further include a full DC charging module electrically connected to the EVSE AC voltage bus and the EVSE DC voltage bus. The full DC charging module includes a second OBCM electrically connected to the EVSE AC voltage bus and the EVSE DC voltage bus. The second OBCM is connectable with the AC power supply. The second OBCM is configured to convert the AC power to the DC power to solely provide the DC power to the vehicle.

The EVSE controller is programmed to: initiate communication between the EVSE charging system and the vehicle upon connection of the coupler to the vehicle; receive data from the vehicle indicative that the vehicle is compatible with simultaneous AC and DC charging; and in response from receiving data from the vehicle indicative that the vehicle is compatible with simultaneous AC and DC charging, communicate data that is indicative of EVSE readiness and voltage capacity to the vehicle.

The EVSE controller is configured to receive data that is indicative of readiness and voltage capacity from the vehicle after the EVSE controller communicates to the vehicle the data that is indicative of EVSE readiness and voltage capacity. The EVSE controller is programmed to: initiate communication between the EVSE charging system and the vehicle upon connection of the coupler to the vehicle; receive data from the vehicle indicative that the vehicle is not compatible with simultaneous AC and DC charging; and in response from receiving data from the vehicle indicative that the vehicle is not compatible with simultaneous AC and DC charging, command at least one relay to switch to the open state to solely provide the DC power to the vehicle.

The present disclosure further describes a method for simultaneously providing DC power and AC power to a vehicle. The method includes connecting an electric vehicle service equipment (EVSE) charging system to the vehicle. The EVSE charging system includes an EVSE AC voltage bus connectable to an AC power supply, at least one coupler configured to be connected to a charge port of the vehicle and to simultaneously supply an alternating current (AC) power and a direct current (DC) power to the vehicle. The coupler establishes communication between the vehicle and the EVSE charging system when the coupler is connected to the charge port of the vehicle. The EVSE AC voltage bus is selectively connected to the coupler. The EVSE charging system further includes an offboard charging module (OBCM) electrically connected to the EVSE AC voltage bus. The OBCM is configured to convert the AC power to the DC power. The OBCM is electrically connected between the coupler and the AC power supply. The EVSE charging system includes an EVSE DC voltage bus electrically connected to the coupler and at least one relay connected between the AC power supply and the coupler. The relay has a closed state and an open state. The EVSE charging system is configured to simultaneously provide the AC power and the DC power to the vehicle through the coupler when the relay is in the closed state. The EVSE charging system is configured to solely provide the DC power to the vehicle through the coupler when the at least one relay is in the open state.

The method further includes determining, via an EVSE controller, whether both the vehicle and the EVSE charging system are compatible with simultaneous AC and DC charging; and in response to determining that both the vehicle and the EVSE charging system are compatible with simultaneous AC and DC charging, commanding, via the EVSE controller, the at least one relay to switch to the closed state to simultaneously provide the AC power and the DC power to the vehicle through the CCS coupler.

The method may further include starting charging the vehicle with one of the AC power or the DC power. The method may further include continuing charging the vehicle with the AC power and the DC power.

The present disclosure also describes an EVSE-vehicle system. The EVSE-vehicle system includes an EVSE charging system and a vehicle. The EVSE charging system includes an EVSE AC voltage bus connectable to an alternating current (AC) power supply, at least one coupler electrically connected to the EVSE AC voltage bus, and an offboard charging module electrically connected to the EVSE AC voltage bus. The offboard charging module is configured to convert an AC power to a direct current (DC) power. The offboard charging module is electrically connected between the coupler(s) and the AC power supply. The EVSE charging system further includes an EVSE DC voltage bus electrically connected to the coupler and at least one relay connected between the AC power supply and the coupler. The relay or relays have a closed state and an open state. The EVSE charging system further includes an EVSE controller coupled to the at least one relay. The EVSE controller is programmed to: determine whether both a vehicle and the EVSE charging system are compatible with simultaneous AC and DC charging; and in response to determining that both the vehicle and the EVSE charging system are compatible with simultaneous AC and DC charging, command the relay to switch to the closed state to simultaneously provide the AC power and the DC power to the vehicle through the coupler. The EVSE-vehicle system includes a vehicle. The vehicle includes a charge port. The charge port is connectable to the coupler to charge the vehicle simultaneously with the AC power and the DC power.

The coupler is configured to be connected to the charge port of the vehicle and to simultaneously supply an alternating current (AC) power and a direct current (DC) power to the vehicle. The coupler establishes communication between the vehicle and the EVSE charging system when the coupler is connected to the charge port of the vehicle. The EVSE AC voltage bus is selectively connected to the coupler. The EVSE charging system is configured to simultaneously provide the AC power and the DC power to the vehicle through the coupler when the relay is in the closed state. The EVSE charging system is configured to solely provide the DC power to the vehicle through the coupler when the relay is in the open state. The vehicle includes an onboard charging module electrically connected to the charge port.

The vehicle includes a vehicle DC voltage bus and a vehicle AC voltage bus each electrically connected to the charge port. The onboard charging module is electrically connected to the vehicle AC voltage bus. The onboard charging module is configured to convert the AC power to the DC power. The vehicle further includes a rechargeable energy storage system electrically connected to the EVSE DC voltage bus and the onboard charging module. The rechargeable energy storage system is configured to store electrical energy. The vehicle further includes an electric machine electrically connected to the rechargeable energy storage system. The vehicle further includes a vehicle controller. The EVSE controller is programmed to initiate communication with the vehicle controller when the coupler is connected to the charge port of the vehicle.

The above features and advantages and other features and advantages of the present teachings are readily apparent from the following detailed description of the best modes for carrying out the teachings when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary, or the following detailed description. As used herein, the term "module" refers to hardware, software, firmware, electronic control component, processing logic, and/or processor device, individually or in combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

Figure 1:
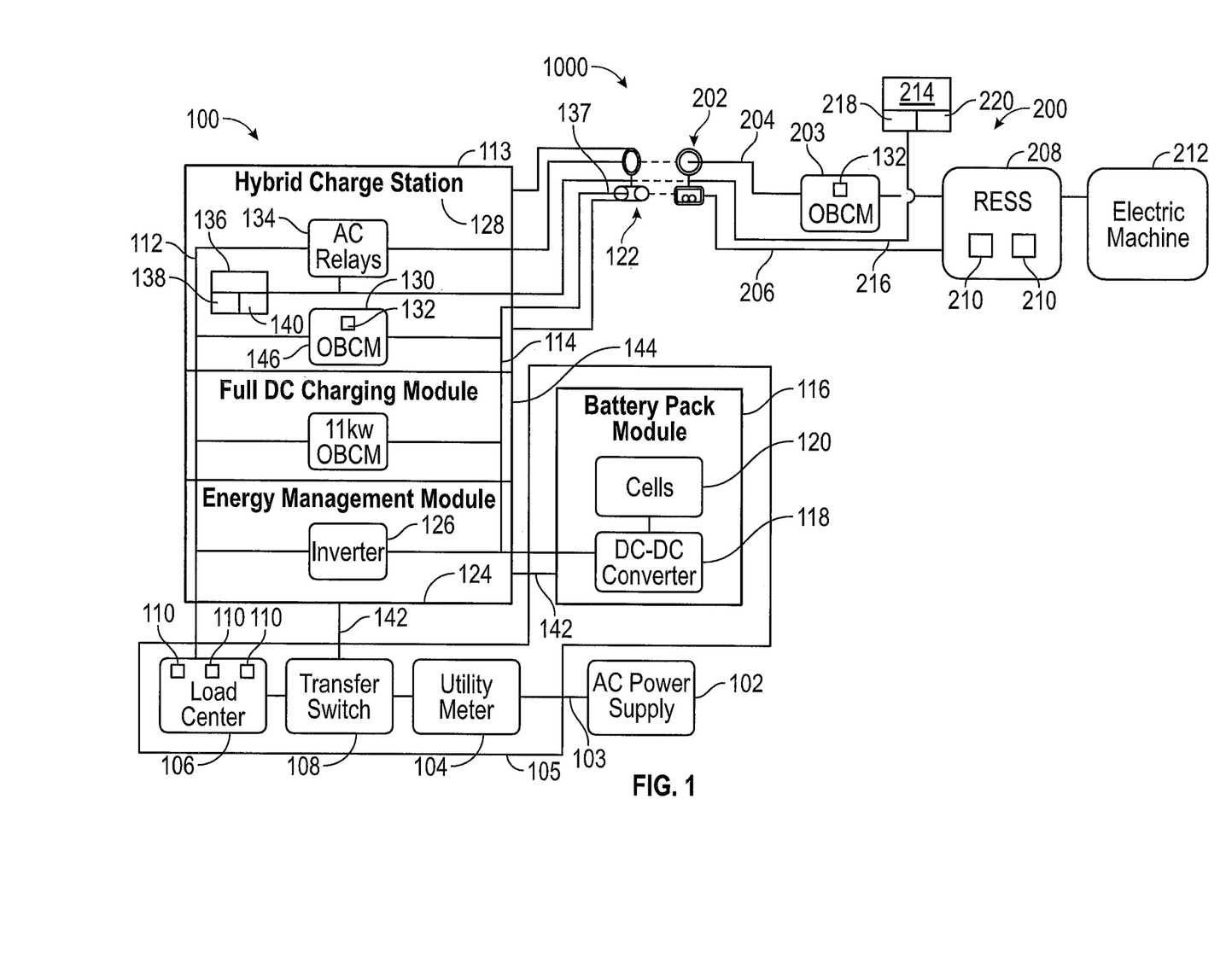
FIG. 1 is a schematic diagram of an AC/DC EVSE charging system.

FIG. 1 schematically illustrates an EVSE charging system 100 for simultaneously providing AC and DC power to a vehicle 200, such as a Plug-In Electric Vehicle (PEV). The EVSE charging system 100 and the vehicle 200 may collectively be referred to as an EVSE-vehicle system 1000. The EVSE charging system 100 connectable to an AC power supply 102. It is envisioned that the EVSE charging system 100 may include the AC power supply 102. The AC power supply 102 provides AC electricity from a company or an electrical utility company via a grid 103. In the case that the EVSE charging system 100 is part of an infrastructure 105 (e.g., a house), the electricity supplied by the AC power supply comes into the house via a utility meter 104. The utility meter 104 may measure the electricity consumed in the infrastructure 105.

The EVSE charging system 100 may further include a load center 106 and a transfer switch 108 electrically coupled between the load center 106 and the utility meter 104. The transfer switch 108 has an open state and a closed state. In the closed state, the electricity flows from the AC power supply 102 to the infrastructure 105. In the open state, the infrastructure 105 is isolated from the grid 103. Thus, electricity does not flow from the AC power supply 102 to the load center 106 when the transfer switch 108 is in the open state. The load center 106 may be referred to as a fuse box and includes one or more AC overcurrent protection devices 110, such as breakers and fuses. Further, the load center 106 creates individual branch circuits wired through the house (e.g., bedroom, furnace, an EVSE 113, etc.).

The EVSE charging system 100 includes an EVSE AC voltage bus 112 and an EVSE DC voltage bus 114. The EVSE AC voltage bus 112 is electrically connected to the load center 106 to receive AC electricity from the AC power supply 102 via the utility meter 104. The EVSE DC voltage bus 114 may be electrically connected to a battery pack module 116, which may be part of the infrastructure 105 (e.g., house, apartment building, condominium, commercial building, industrial building, etc.).

The battery pack module 116 actively manages all aspects of the electrical system of the infrastructure 105, including generation, consumption, and distribution among the infrastructure 105, the vehicle 200, and the grid 103. The battery pack module 116 provides on-site storage of electrical energy and includes a DC-DC converter 118 electrically connected to the EVSE DC voltage bus 114. The DC-DC converter 118 adjusts voltage to permit interface with additional packs of varying voltage. In addition, the battery pack module 116 further includes a plurality of battery cells 120 for storing electrical energy. The battery cells 120 are electrically connected to the DC-DC converter 118, and the DC-DC converter 118 is electrically coupled between at least one coupler 122, such as a combined charging system (CCS) coupler or paired independent AC and DC couplers, and the battery cells 120. The DC-DC converter 118 is configured to change the voltage output received through the coupler 122 from a first voltage output to a second voltage output that is compatible with the battery cells 120 to allow electrical energy to be stored in the battery cells 120.

The EVSE charging system 100 includes the EVSE 113. The EVSE 113 may include an energy management module electrically connected to the EVSE AC voltage bus 112 and the EVSE DC voltage bus 114. The energy management module 124 functions as a vehicle 200 to home (V2H) or vehicle 200 to grid 103 (V2G) system to enable the vehicle 200 to act as a power source for the infrastructure 105 or the grid 103. In other words, AC power may be generated from the vehicle 200 for either V2G operation, by isolating the infrastructure 105 via the transfer switch 108, or V2H operation. For V2G operation, the transfer switch 108 is in the open state to isolate the infrastructure 105 from the grid 103. The energy management module 124 includes an inverter 126 electrically connected to the EVSE DC voltage bus 114 and the EVSE AC voltage bus 112, and is configured to convert DC voltage received from the vehicle 200 into AC voltage to power the infrastructure 105.

The EVSE 113 further includes a hybrid charge station 128 configured to simultaneously charge the vehicle 200 with AC power and DC power. The hybrid charge station 128 includes a first offboard charging module (OBCM) 130 electrically connected between the EVSE AC voltage bus 112 and the EVSE DC voltage bus 114. The first OBCM 130 may have a 11 kW rating and is configured to convert AC power to DC power. As a non-limiting example, the first OBCM 130 may be a bidirectional AC-DC rectifier configured to convert AC power to DC power. In some embodiments, the first OBCM 130 includes a transformer 132 to maintain galvanic isolation between the AC/DC power sources. The first OBCM 130 is electrically connected to the coupler 122 and the AC power supply 102 to supply the vehicle 200 with DC power once the AC power from the AC power supply 102 has been converted to DC power. The hybrid charge station 128 is able to simultaneously charge one vehicle 200 with DC power and another vehicle (not shown) with AC power. When solely the vehicle 200 is charging or a second vehicle (not shown) underutilizes the full capacity of the AC charging, a compatible plug-in electric vehicle will be able to draw the underutilize AC power while simultaneously DC charging.

In addition to the first OBCM 130, the hybrid charge station 128 includes one or more relays 134 electrically connected between the AC power supply 102 and the coupler 122. Thus, the first OBCM 130 includes at least one relay 134. Regardless of the quantity, each relay 134 has a closed state and an open state. The hybrid charge station 128 is configured to simultaneously provide AC power and DC power to the vehicle 200 through the CCS coupler when at least one of the relays 134 are in the closed state. On the other hand, when all of the relays 134 are in the open state, the hybrid charge station 128 solely provide DC power to the vehicle 200 through the coupler 122. In case there is solely one relay 134, the hybrid charge station 128 solely provides DC power to the vehicle 200 when that single relay 134 is in the open state. The first OBCM 130 and the relays 134 are electrically connected in parallel to simultaneously provide AC power and DC power to the vehicle through the coupler 122 when the at least one relay 134 is in the closed state.

The EVSE 113 includes an EVSE controller 136 in electronic communication with the relays 134 and other various mechanisms or devices configured to perform the method 300 (FIG. 3). While depicted as a single unit for illustrative purposes, the EVSE controller 136 may additionally include one or more other controllers, collectively referred to as a "controller." The EVSE controller 136 may include an EVSE processor 138, such as microprocessor or central processing unit (CPU), in communication with various types of EVSE computer readable storage devices or media 140. The EVSE computer readable storage devices or media 140 may include volatile and nonvolatile storage in read-only memory (ROM), random-access memory (RAM), and keep-alive memory (KAM), for example. KAM is a persistent or non-volatile memory that may be used to store various operating variables while the CPU is powered down. EVSE computer-readable storage devices or media 140 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the EVSE controller 136.

In the depicted embodiment, the EVSE controller 136 is in wired or wireless communication with the relays 134, the transfer switch 108 and the battery pack module 116. For example, control lines 142 may be used to connect the EVSE controller 136 with the transfer switch 108 and the battery pack module 116. The EVSE controller 136 can command the relays 134 to switch between the open state and the closed state. Further, the EVSE controller 136 can command the transfer switch 108 to switch between the open state and the closed state.

The EVSE 113 further includes a full DC charging module 144 electrically connected to the EVSE AC voltage bus 112 and the EVSE DC voltage bus 114. The full DC charging module 144 includes a second offboard charging module (OBCM) 146 electrically connected to the EVSE AC voltage bus 112 and the EVSE DC voltage bus 114. The second OBCM 146 is connectable with the AC power supply 102. Further, the second OBCM 146 is configured to convert AC power to DC power to solely provide DC power to vehicles that are not capable of AC and DC charging. While the depicted embodiment shows the second OBCM 146, it is envisioned that the full DC charging module 144 may include more OBCMs. Regardless of the quantity, the second OBCM 146 is electrically connected between the AC power supply 102 and the Coupler 122 to provide DC power to the vehicle 200.

The coupler 122 is electrically connected to the EVSE AC voltage bus 112 and the EVSE DC voltage bus 114 and is configured to be connected to a charge port 202 of the vehicle 200. Once the coupler 122 is connected to the charge port 202 of the vehicle 200, the EVSE charging system 100 is able to charge the vehicle 200 simultaneously with AC power and DC power. The EVSE 113 further includes an EVSE data bus 137 electrically connected between the coupler 122 and the EVSE controller 136. Accordingly, when the coupler 122 is connected to the charge port 202 of the vehicle 200, the EVSE controller 136 is able to exchange data with the vehicle 200.

The vehicle 200 includes the charge port 202 configured to be connected to the coupler 122. In addition, the vehicle 200 includes a vehicle AC voltage bus 204 and a vehicle DC voltage bus 206 both connected to the charge port 202. The vehicle 200 further includes a vehicle onboard charging module (OBCM) 203 electrically connected to the AC voltage bus 204. The vehicle OBCM 203 may be a bidirectional AC-DC rectifier configured to convert AC power to DC power. The vehicle OBCM 203 may include a transformer 132 to maintain galvanic isolation between the AC/DC power sources.

The vehicle 200 further includes a rechargeable energy storage system (RESS) 208 for storing electrical energy. The RESS 208 includes one or more battery packs 210 each configured to store electrical energy. The vehicle OBCM 203 is electrically connected between the RESS 208 and the charge port 202. Further, the vehicle OBCM 203 is electrically connected in series with the RESS 208 to facilitate storage of DC electrical energy by the RESS 208. The vehicle DC voltage bus 206 is also electrically connected in series with the RESS 208 to facilitate storage of electrical energy in the RESS 208. However, the vehicle OBCM 203 is electrically connected in parallel with the vehicle DC voltage bus 206 to facilitate simultaneous DC and AC charging.

The vehicle 200 further includes an electric machine 212 configured to function as an electric motor and/or a generator. Thus, the electric machine 212 is configured to convert mechanical energy to electrical energy and/or vice-versa. The electric machine 212 is electrically connected to the RESS 208. Accordingly, the RESS 208 may supply electrical energy to the electric machine 212. Alternatively, the electric machine 212 may convert mechanical energy into electrical energy to charge the RESS 208.

The vehicle 200 further includes a vehicle controller 214 coupled to the vehicle OBCM 203 and the charge port 202. Specifically, the vehicle 200 may include a vehicle data bus 216 interconnecting the charge port 202 and the vehicle controller 214. The vehicle controller 214 may include a vehicle processor 218, such as microprocessor or central processing unit (CPU), in communication with various types of vehicle computer readable storage devices or media 220. When the coupler 122 is connected to the charge port 202, data may be exchanged between the EVSE controller 136 and the vehicle controller 214 through the EVSE data bus 137 and the vehicle data bus 216. The vehicle controller 214 and/or the EVSE controller 136 are specifically programmed to execute the method 300 (FIG. 2).

Figure 2:
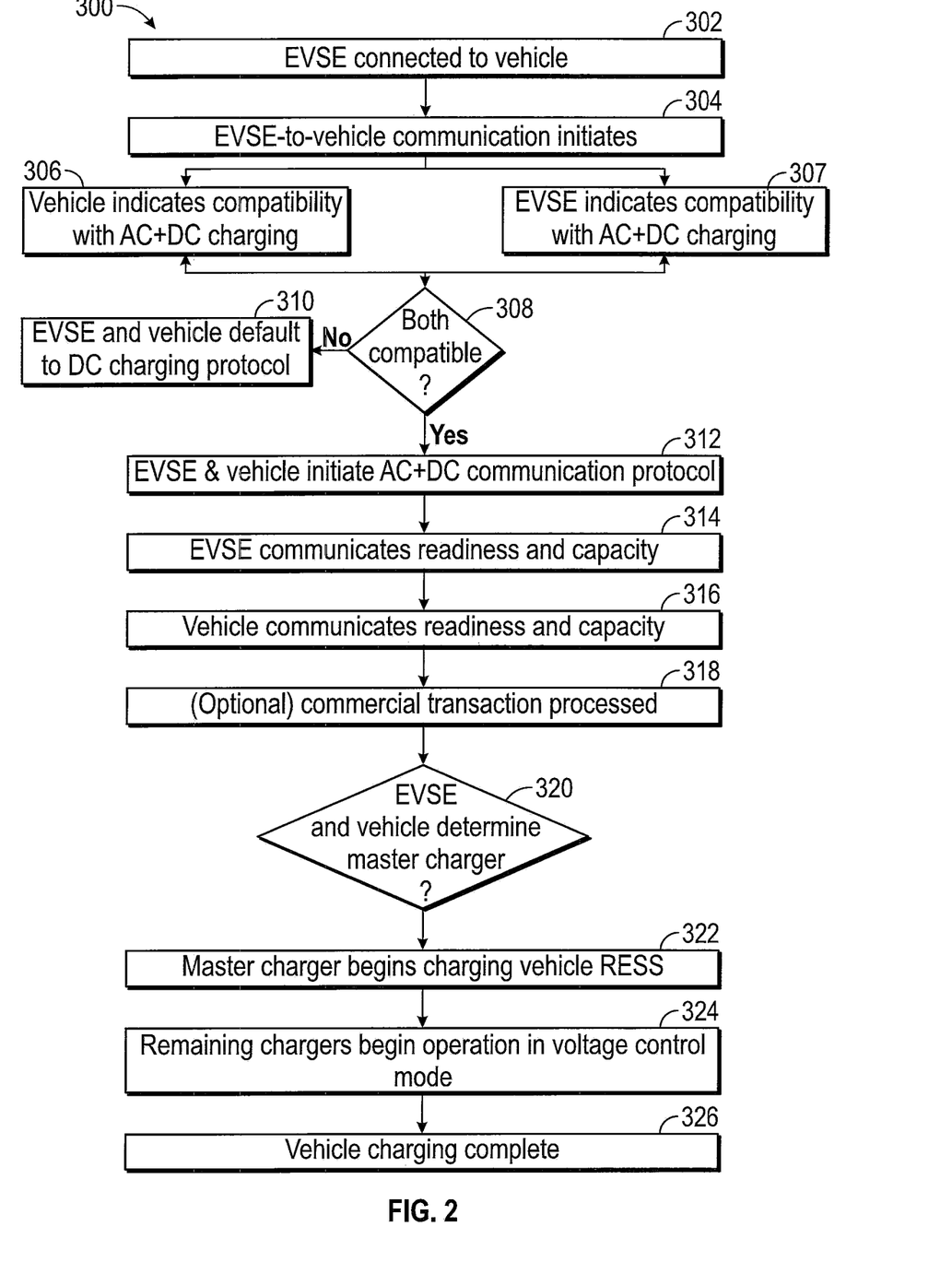
FIG. 2 is a flowchart of a method for simultaneously providing AC and DC power to a vehicle.

FIG. 2 is a flowchart of a method for simultaneously providing DC power and AC power to the vehicle 200. The method 300 begins at block 302, wherein the EVSE charging system 100 is connected to the vehicle 200. To do so, the coupler 122 is physically connected to the charge port 202 of the vehicle 200. After block 302, the method 300 proceeds to block 304.

At block 304, the EVSE controller 136 initiates communication with the vehicle controller 214. At this point, the vehicle controller 214 and the EVSE controller 136 may exchange data through the EVSE data bus 137 and the vehicle data bus 216. Then, the method 300 continues to blocks 306 and 307.

At block 306, the vehicle controller 214 sends data to the EVSE charging system 100 indicative of whether or not the vehicle 200 is compatible with simultaneous AC and DC charging. This data may be stored in the vehicle computer readable storage devices or media 220. The EVSE controller 136 receives this data, which is indicative of whether or not the vehicle 200 is compatible with simultaneous AC and DC charging.

At block 307, the EVSE controller 136 sends data to the vehicle controller 214 indicative of whether or not the EVSE charging system 100 is compatible with simultaneous AC and DC charging. This data may be stored in the EVSE computer readable storage devices or media 140. The vehicle controller 214 receives this data, which is indicative of whether or not the EVSE charging system 100 is compatible with simultaneous AC and DC charging. Then, the method 300 proceeds to block 308.

At block 308, the EVSE controller 136 and/or the vehicle controller 214 determines whether both the vehicle 200 and the EVSE charging system 100 is compatible with simultaneous AC and DC charging. If the vehicle 200 and/or the EVSE charging system 100 are not compatible with simultaneous AC and DC charging, then the method 300 proceeds to block 310. At block 310, the EVSE charging system 100 defaults to the DC charging protocol to charge the vehicle 200 solely with DC power. If both the vehicle 200 and the EVSE charging system 100 are compatible with simultaneous AC and DC charging, then the method 300 continues to block 312.

At block 312, the EVSE controller 136 and/or the vehicle controller 214 initiate the AC+DC communication protocol. This protocol entails communication of data relevant to simultaneous AC and DC charging, such as state of charge of the RESS 208. The method 300 then continues to block 314.

At block 314, the EVSE controller 136 communicates to the vehicle controller 214 the readiness and capacity of the EVSE charging system 100. For example, the EVSE controller 136 may communicate to the vehicle controller 214 the voltage rating of the EVSE charging system 100 and that the EVSE charging system 100 is ready to charge the vehicle 200. Then, the method 300 continues to block 316.

At block 316, the vehicle controller 214 communicates to the EVSE controller 136 the readiness and capacity of the vehicle 200. For example, the vehicle controller 214 may communicate to the EVSE controller 136 the voltage rating of the vehicle 200 and that the vehicle 200 is ready for simultaneous AC and DC charging. Then, the method 300 proceeds to block 318.

At block 318, a commercial transaction may be processed. In other words, at block 318, a user of the EVSE charging system 100 may have to pay to charge the vehicle 200. Then, the method 300 continues to block 320.

At block 320, the EVSE controller 136 and/or the vehicle controller 214 determines the master charger. In other words, the EVSE controller 136 and/or the vehicle controller 214 determines whether to initially charge the vehicle 200 with DC power or AC power based, for example, on the state of charge and the voltage rating of the RESS 208. The method 300 then continues to block 322.

At block 322, the EVSE controller 136 commands the EVSE 113 to start charging the vehicle 200 solely using DC power or AC power as determined in block 320. The method 300 then proceeds to block 324.

At block 324, the EVSE controller 136 commands the EVSE 113 to charge the vehicle 200 with the remaining charges (i.e., DC power or AC power) in voltage control mode. In other words, at this point, the EVSE controller 136 commands the EVSE 113 to simultaneously charge the vehicle 200 with DC power and AC power taking into account the voltage rating of the RESS 208. Then, the method 300 proceeds to block 326. At block 326, the vehicle charging is complete.

While the best modes for carrying out the teachings have been described in detail, those familiar with the art to which this disclosure relates will recognize various alternative designs and embodiments for practicing the teachings within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. The phrase "at least one of" as used herein should be construed to include the non-exclusive logical "or", i.e., A and/or B and so on depending on the number of components.

What is claimed is:

1. An Electric Vehicle Supply Equipment (EVSE) charging system, comprising:
   an EVSE AC voltage bus connectable to an AC power supply;
   an EVSE DC voltage bus connectable to an AC power supply;
   at least one coupler configured to be connected to at least one charging inlet of a Plug-in Electric Vehicle (PEV) and to simultaneously supply Alternating Current (AC) power and Direct Current (DC) power to the PEV, wherein the EVSE establishes communication between the PEV and the EVSE charging system when the at least one coupler is connected to the at least one charging inlet of the PEV;
   an Offboard Charging Module (OBCM) electrically connected to the AC voltage bus, wherein the OBCM is configured to convert the AC power to the DC power, the OBCM is electrically connected between the at least one coupler and the AC power supply;
   an EVSE DC voltage bus electrically connected to the at least one coupler;
   at least one relay connected between the AC power supply and the at least one coupler, wherein the at least one relay has a closed state and an open state, the EVSE charging system is configured to simultaneously provide the AC power and the DC power to the PEV through the at least one coupler when the at least one relay is in the closed state, wherein the EVSE charging system is configured to solely provide DC power to the PEV through the at least one coupler when the at least one relay is in the open state;
   an EVSE controller coupled to the at least one relay;
   wherein the EVSE controller is programmed to:
      determine whether both the PEV and the EVSE charging system are compatible with simultaneous AC and DC charging; and
      in response to determining that both the PEV and the EVSE charging system are compatible with simultaneous AC and DC charging, command the at least one relay to switch to the closed state to simultaneously provide AC power and DC power to the PEV through the at least one coupler.

2. The EVSE charging system of claim 1, wherein the EVSE DC voltage bus is electrically connected to the at least one coupler regardless of whether the at least one relay is in the open state or the closed state.

3. The EVSE charging system of claim 1, wherein the OBCM and the at least relay is electrically connected in parallel to simultaneously provide AC power and DC power to the PEV through the at least one coupler when the at least one relay is in the closed state.

4. The EVSE charging system of claim 1, further comprising an energy management module electrically connected to the EVSE AC voltage bus and the EVSE DC voltage bus, wherein the energy management module functions as a vehicle to home (V2H) system or a vehicle to grid (V2G) system to enable the PEV to act as a power source, and the energy management module includes an inverter electrically connected to the EVSE AC voltage bus, and the inverter is configured to convert DC voltage into AC voltage.

5. The EVSE charging system of claim 1, further comprising a battery pack module electrically connected to the EVSE DC voltage bus, wherein the battery pack module includes a DC-DC converter electrically connected to the EVSE DC voltage bus, the battery pack module further includes a plurality of battery cells electrically connected to the DC-DC converter, the DC-DC converter is electrically coupled between the at least one coupler and the plurality of battery cells, and the DC-DC converter is configured to change a voltage output received through the at least one coupler from a first voltage output to a second voltage output that is compatible with the plurality of battery cells.

6. The EVSE charging system of claim 1, further comprising a utility meter, a transfer switch, and a load center electrically connected to the AC power supply, wherein the transfer switch is electrically connected between the utility meter and the load center, the load center includes AC overcurrent protection devices, and at least one of the AC overcurrent protection devices is a breaker.

7. The EVSE charging system of claim 1, wherein the OBCM is a first OBCM, and the EVSE charging system further comprises a full DC charging module electrically connected to the EVSE AC voltage bus and the EVSE DC voltage bus, the full DC charging module includes a second OBCM electrically connected to the EVSE AC voltage bus and the EVSE DC voltage bus, the second OBCM is connectable with the AC power supply, and the second OBCM is configured to convert the AC power to the DC power to solely provide the DC power to the PEV.

8. The EVSE charging system of claim 1, wherein the EVSE controller is programmed to:
initiate communication between the EVSE charging system and the PEV upon connection of the at least one coupler to the PEV;
receive data from the PEV indicative that the PEV is compatible with simultaneous AC and DC charging; and
in response from receiving data from the PEV indicative that the PEV is compatible with simultaneous AC and DC charging, communicate data that is indicative of EVSE readiness and electrical power capacity to the PEV.

9. The EVSE charging system of claim 8, wherein the EVSE controller is configured to receive data that is indicative of readiness and electrical power capacity from the PEV after the EVSE controller communicates the data that is indicative of EVSE readiness and electrical power capacity to the PEV.

10. The EVSE charging system of claim 9, wherein the EVSE controller is programmed to:
initiate communication between the EVSE charging system and the PEV upon connection of the at least one coupler to the PEV;
receive data from the PEV indicative that the PEV is not compatible with simultaneous AC and DC charging; and
in response from receiving data from the PEV indicative that the PEV is not compatible with simultaneous AC and DC charging, command the at least one relay to switch to the open state to solely provide AC or DC power to the PEV.

11. A method for simultaneously providing DC power and AC power to a Plug-In Electric Vehicle (PEV), comprising:
connecting an Electric Vehicle Supply Equipment (EVSE) charging system to the vehicle, wherein the EVSE charging system includes:
an EVSE AC voltage bus connectable to an AC power supply;
an EVSE DC voltage bus connectable to an AC power supply;
at least one coupler configured to be connected to at least one charging inlet of a vehicle and to simultaneously supply Alternating Current (AC) power and Direct Current (DC) power to the PEV, wherein the EVSE establishes communication between the PEV and the EVSE charging system when the at least one coupler connected to the at least one charging inlet of the PEV;
an Offboard Charging Module (OBCM) electrically connected to the AC voltage bus, wherein the OBCM is configured to convert the AC power to the DC power, the OBCM is electrically connected between the at least one coupler and the AC power supply;
an EVSE DC voltage bus electrically connected to the at least one coupler;
at least one relay connected between the AC power supply and the at least one coupler, wherein at least one relay has a closed state and an open state, the EVSE charging system is configured to simultaneously provide the AC power and the DC power to the PEV through the at least one coupler when the at least one relay is in the closed state, the EVSE charging system is configured to solely provide the DC power to the PEV through the at least one coupler when the at least one relay is in the open state;
determining, via an EVSE controller, whether both the PEV and the EVSE charging system are compatible with simultaneous AC and DC charging; and
in response to determining that both the PEV and the EVSE charging system are compatible with simultaneous AC and DC charging, commanding, via the EVSE controller, the at least one relay to switch to the closed state to provide simultaneous AC power and DC power to the vehicle through the at least one coupler.

12. The method of claim 11, further comprising initiating charging of the PEV with either AC power or DC power.

13. The method of claim 12, further comprising continuing charging the PEV with AC power and DC power.

14. An EVSE-vehicle system, comprising:
an EVSE charging system including:
an EVSE AC voltage bus connectable to an Alternating Current (AC) power supply;
at least one coupler electrically connected to the EVSE AC voltage bus;
an Offboard Charging Module (OBCM) electrically connected to the EVSE AC voltage bus, wherein the OBCM is configured to convert AC power to Direct Current (DC) power, the OBCM is electrically connected between the at least one coupler and the AC power supply;
an EVSE DC voltage bus electrically connected to the at least one coupler;
at least one relay connected between the AC power supply and the at least one coupler, wherein the at least one relay has a closed state and an open state;
an EVSE controller coupled to the at least one relay;
wherein the EVSE controller is programmed to:
  determine whether both a Plug-In Electric Vehicle and the EVSE charging system are compatible with simultaneous AC and DC charging;
  in response to determining that both the PEV and the EVSE charging system are compatible with simultaneous AC and DC charging, command the at least one relay to switch to the closed state to provide simultaneous AC power and DC power to the vehicle through the at least one coupler; and
wherein the PEV comprises at least one charging inlet, wherein the at least one charging inlet is connectable to the at least one coupler to charge the PEV simultaneously with AC power and DC power; and
wherein the at least one coupler is configured to be connected to the at least one charging inlet of the PEV and to simultaneously supply Alternating Current (AC) power and Direct Current (DC) power to the PEV, the at least one coupler establishes communication between the PEV and the EVSE charging system when the at least one coupler is connected to the at least one charging inlet of the PEV, and the EVSE AC voltage bus is selectively connected to the at least one coupler, the EVSE charging system is configured to simultaneously provide AC power and DC power to the PEV through the at least one coupler when the at least one relay is in the closed state, and the EVSE charging system is configured to solely provide DC power to the PEV through the at least one coupler when the at least one relay is in the open state.

15. The EVSE-vehicle system of claim 14, wherein the PEV includes an Onboard Charging Module electrically connected to the at least one charging inlet.

16. The EVSE-vehicle system of claim 15, wherein the PEV includes a vehicle DC voltage bus and a vehicle AC voltage bus each electrically connected to the at least one charging inlet.

17. The EVSE-vehicle system of claim 16, wherein the Onboard Charging Module is electrically connected to the vehicle AC voltage bus, and the Onboard Charging Module is configured to convert AC power to DC power.

18. The EVSE-vehicle system of claim 17, wherein the PEV further includes a Rechargeable Energy Storage System electrically connected to the EVSE DC voltage bus and the Onboard Charging Module, and the Rechargeable Energy Storage System is configured to store electrical energy.

19. The EVSE-vehicle system of claim 18, wherein the PEV further includes an electric machine electrically connected to the rechargeable energy storage system.

20. The EVSE-vehicle system of claim 19, wherein the PEV further includes a vehicle controller, and the EVSE controller is programmed to initiate communication with the vehicle controller when the at least one coupler is connected to the at least one charging inlet of the PEV.

\* \* \* \* \*